United States Patent [19]

Gregg

[11] Patent Number: 5,587,993
[45] Date of Patent: Dec. 24, 1996

[54] OPTICAL TAPE CARTRIDGE HAVING IMPROVED TAPE MOVEMENT MECHANISM

[75] Inventor: David P. Gregg, Culver City, Calif.

[73] Assignee: DiscoVision Associates, Irvine, Calif.

[21] Appl. No.: 268,992

[22] Filed: Jun. 30, 1994

[51] Int. Cl.⁶ ........................................ G11B 7/24
[52] U.S. Cl. .............................. 369/291; 369/292; 226/94
[58] Field of Search ............................. 369/291; 242/346, 242/346.2, 548.2, 548.4; 428/694 RL, 694 MT; 360/77.12; 226/94, 195, 200

[56] References Cited

U.S. PATENT DOCUMENTS

| | | | |
|---|---|---|---|
| 2,859,962 | 4/1955 | Beveridge et al. | 226/94 |
| 4,276,575 | 6/1981 | Schoettle et al. | 360/130.21 |
| 4,524,925 | 6/1985 | Haddock | 360/132 |
| 4,685,638 | 10/1987 | Satoyoshi et al. | 242/199 |
| 4,712,148 | 12/1987 | Balz et al. | 360/132 |
| 4,814,925 | 3/1989 | Beaujean | 360/132 |
| 5,077,724 | 12/1991 | Gregg | 369/258 |
| 5,121,688 | 6/1992 | Williams et al. | 101/142 |
| 5,215,808 | 6/1993 | Barnard | 428/194 |
| 5,272,689 | 12/1993 | Tsujioka et al. | 369/112 |
| 5,358,193 | 10/1994 | Madsen | 242/342 |

*Primary Examiner*—A. J. Heinz
*Assistant Examiner*—Adriana Giordana
*Attorney, Agent, or Firm*—Ronald J. Clark; Robert T. Braun; Donald Bollella

[57] ABSTRACT

An optical tape cartridge is disclosed that is suitable for playing by an optical tape player. The tape player provides the cartridge with a voltage supply capable of supplying the optical tape with a relatively high voltage. The tape cartridge includes a sealed cartridge housing and first and second tape reels that are disposed within and freely rotatable in either direction within the housing. The reels act as tape supply and tape take up reels. Also included in the cartridge is an optical tape that has a first surface on an optically recordable side. The tape is wound on and couples the two reels with a tape segment. The tape segment is positioned with the optically recordable side facing outwardly from each of the reels. The tape includes a conductive layer that extends substantially the length of the optical tape. The conductive layer is grounded at least one end. The housing includes a sealed window positioned on a housing surface that is located across a portion of the tape segment. The window allows optical reading from the segment of optical tape. A conductive guide guides the tape segment past the window. To guide the tape segment in this manner, the guide has a portion disposed adjacent the window. The conductive guide is connected to the relatively high voltage supplied by the tape player power supply. The conductive guide maintains the first surface of the tape segment a relatively fixed distance from the window by electrostatically attracting the grounded conductive layer of the tape segment towards the conductive guide.

26 Claims, 10 Drawing Sheets

OPTICAL TAPE CARTRIDGE HAVING IMPROVED TAPE MOVEMENT MECHANISM

BACKGROUND

This invention relates to a tape cartridge, and more particularly, to an optical tape cartridge.

Much attention has been focused on storage on optical disks. This attention follows the invention of the modern optical disk by David Paul Gregg. As optical disk recording technology has matured, optical disk storage has become commonplace in the consumer market. For example, motion pictures, photographs, data, and music are stored on optical disks of suitable diameters. These various optical disks are distrubuted comercially under trade marks such as Laser Disc, Compact Disc, Mini Disc. These disks employ the same basic stucture and pulse modulation.

While optical disks are the predominant optical storage medium, another optical media, optical tape, has a greater storage capacity. Because of its greater storage capacity, optical tape is a more suitable medium than optical disks for certain storage applications, such as recording and playing programs for High Definition Television (HDTV).

One disadvantage of optical tape is its greater sensitivity to errors caused by dust, smoke or other minute particles, adhering to the tape and obscuring the reading beam. With an optical disk, the recording layer contains indicia having widths of less than 1.0 micrometers, recorded at a pitch of less than 2.0 micrometers. Dust particles are typically about 1 micrometer in diameter. Were dust particles in direct contact with the recording layer, the dust particles would likely obscure the underlying indicia. In optical disk technology, assuming the read or write laser beam has a numerical aperture of about 0.5, the diameter of the beam at the surface of the protective layer would be about 1 millimeter, much larger than the diameter of a typical dust particle.

Unlike an optical disk, an optical tape needs to be thin to be flexible and achieve higher storage density. The optical tape recording layer typically contains indicia that are as small or smaller than those of optical disks. Typical optical tapes are about 25 micrometers thick, including the thickness of the protective layer covering the recording layer. The optical tape protective layer is typically only about 2 to 10 micrometers thick, about 500 to 100 times thinner than that of the optical disk, and therefore much more vulnerable to dust obscuring the indicia in the recording layer.

One approach to dealing with dust and other particles is discussed in U.S. Pat. No. 5,272,689, issued to Tsujioka et al. This patent teaches an optical pickup that includes a transparent contact member that contacts the protective surface of the optical tape, sweeping dust particles away from the path of the beam. The contact member is in the optical path of the beam. Provision is made to adjust the focus of the objective lens to compensate for shortening of the optical path caused by wear of the contact member.

Another approach to the problem of dust obscuring the optical tape is suggested in U.S. Pat. No. 5,215,808, issued to Barnard. This patent teaches providing a small bubble of fluid (e.g., gas or liquid) trapped between the recording surface and the protective surface. During recording or playing, the trapped bubble displaces dust particles out of the focus zone of the read/write beam. As the tape moves, the trapped bubble is held in place under the read/write beam.

Another approach to the problem of dust and other minute particles is simply to house the optical tape in a sealed cartridge. U.S. Pat. No. 4,814,925 to Beaujean discloses a hermetically sealed cassette containing a recording tape. The cassette is filled with an inert low pressure gas which does not react chemically with the surface of the tape or with the surface of a tape guide means.

Sealing the cartridge, however, presents the difficulty of conveying mechanical motion to moving parts located within the sealed cartridge. One solution to this difficulty is taught by U.S. Pat. No. 5,077,724 to David Paul Gregg. This patent discloses a sealed optical tape cassette in which an optical tape is pulled across a mobile recording bridge situated behind a transparent window. The bridge is operated upon by a pair of sealed internal/external pins to control tape tilt, focus and tracking of a light beam from a spinning optical head in a recorder/player to a desired point on the optical tape.

There is therefore a need for an improved optical tape cartridge that is low cost, reliable, and suitable for storing HDTV recordings.

SUMMARY OF THE INVENTION

An optical tape cartridge is disclosed that is suitable for playing by an optical tape player. The tape player provides the cartridge with a voltage supply capable of supplying the optical tape with a relatively high voltage. The tape cartridge includes a sealed cartridge housing and first and second tape reels that are disposed within and freely rotatable in either direction within the housing. The reels act as tape supply and tape take up reels. Also included in the cartridge is an optical tape that has a first surface on an optically recordable side. The tape is wound on and couples the two reels with a tape segment. The tape segment is positioned with the optically recordable side facing outwardly from each of the reels. The tape includes a conductive layer that extends substantially the length of the optical tape. The conductive layer is grounded on at least one end. The housing includes a sealed window positioned on a housing surface that is located across a portion of the tape segment. The window allows optical reading from the segment of optical tape. A conductive guide guides the tape segment past the window. To guide the tape segment in this manner, the guide has a portion disposed adjacent the window. The conductive guide is connected to the relatively high voltage supplied by the tape player power supply. The conductive guide maintains the first surface of the tape segment at a relatively fixed distance from the window by electrostatically attracting the grounded conductive layer of the tape segment towards the conductive guide.

DETAILED DESCRIPTION OF THE PREFERRED EMBODIMENTS

Figure 1:
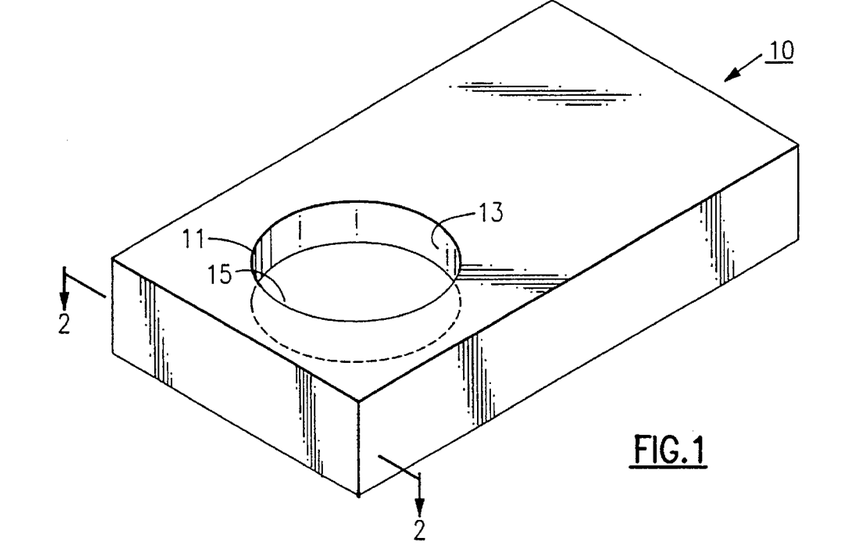
FIG. 1 is an isometric drawing of an optical ribbon paquette according to the present invention.

First Embodiment Referring now to FIG. 1, there is shown an isometric view of a first preferred embodiment of a an optical ribbon cartridge or paquette 10 embodying the present invention. The paquette 10 is generally rectangular in shape, preferably about the same shape and size as an audio or VHS video tape cartridge, depending upon the application. The paquette 10 includes a cylindrical aperture 11 into which a helical scan head (not shown) of an optical tape player (not shown) can be inserted. A wall 13 of aperture 11 includes a window portion 15 that is transparent to light. Window portion 15 provides the helical scan head optical access to an optical tape or fillet 12, FIG. 2. Moreover, window portion 15 facilitates vertical edge registration of tape or fillet 12, as discussed further herein.

Figure 2:
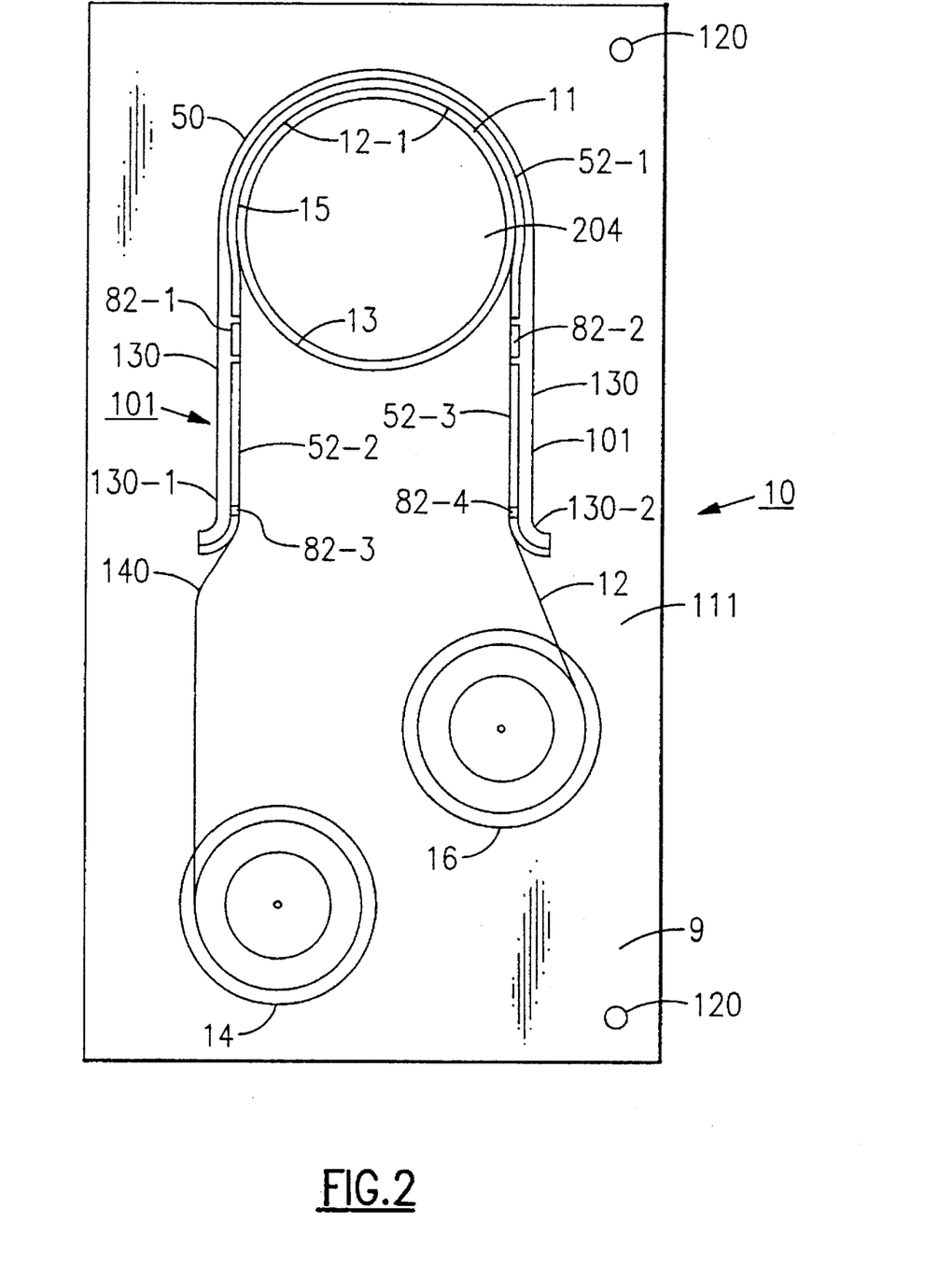
FIG. 2 is a cross-sectional plan view of the optical ribbon paquette of FIG. 1, taken along section line 2—2.
Figure 3:
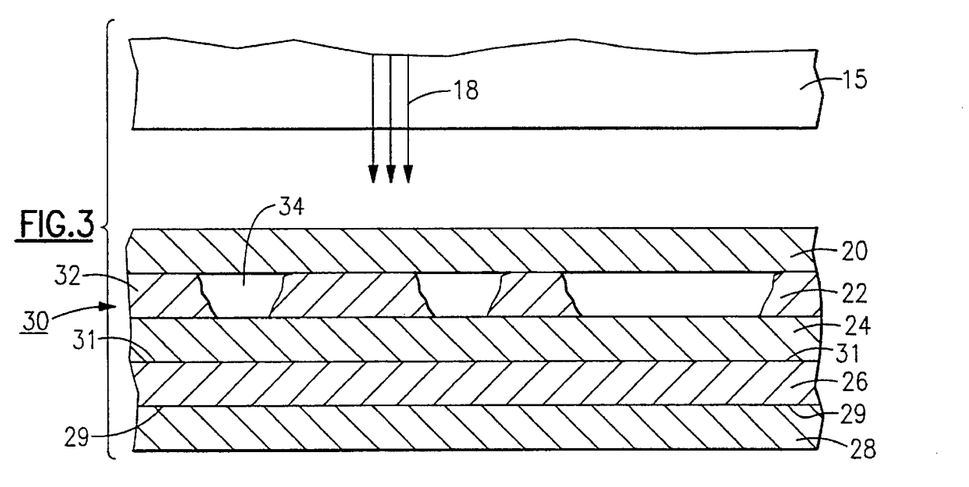
FIG. 3 is a diagram of the layers that form the optical ribbon in the paquette of FIG. 1.
Figure 4:
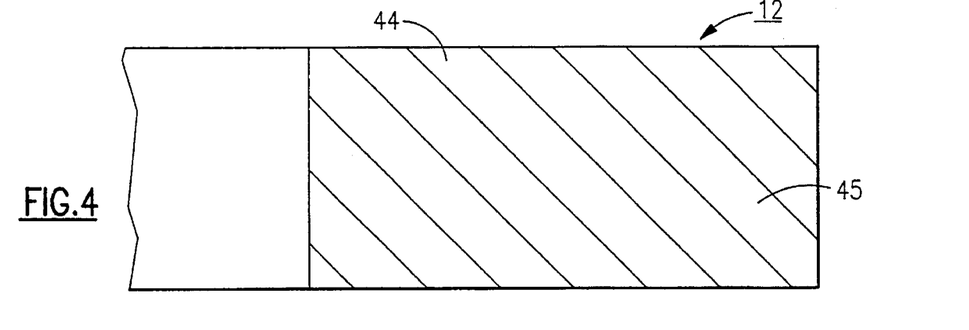
FIG. 4 is a diagram of the leader of each end of the optical ribbon of FIG. 3, showing how the conductive reflective layer is exposed.
Figure 5:
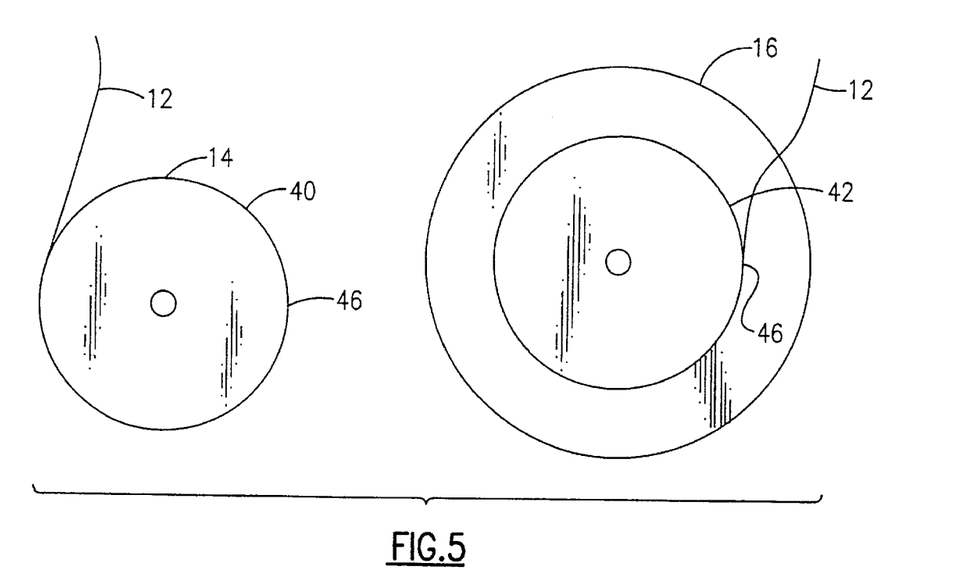
FIG. 5 is a diagram of a plan view of the supply and take up reels of the paquette of FIG. 1.
Figure 6:
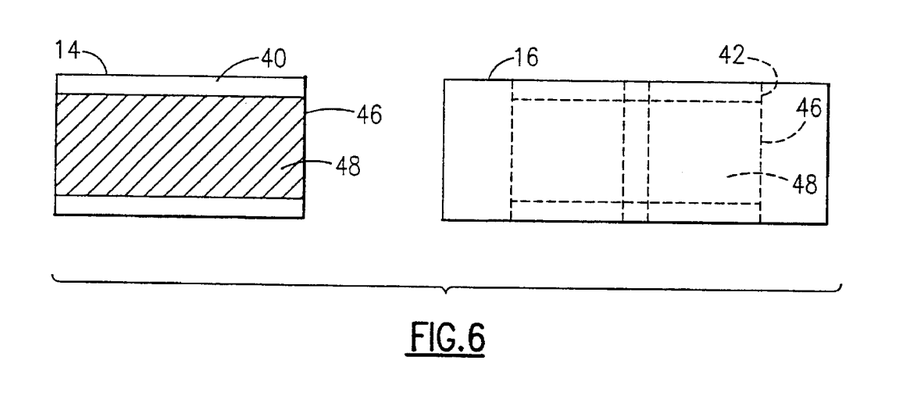
FIG. 6 is a diagram of a front view of the reels of FIG. 5.
Figure 7:
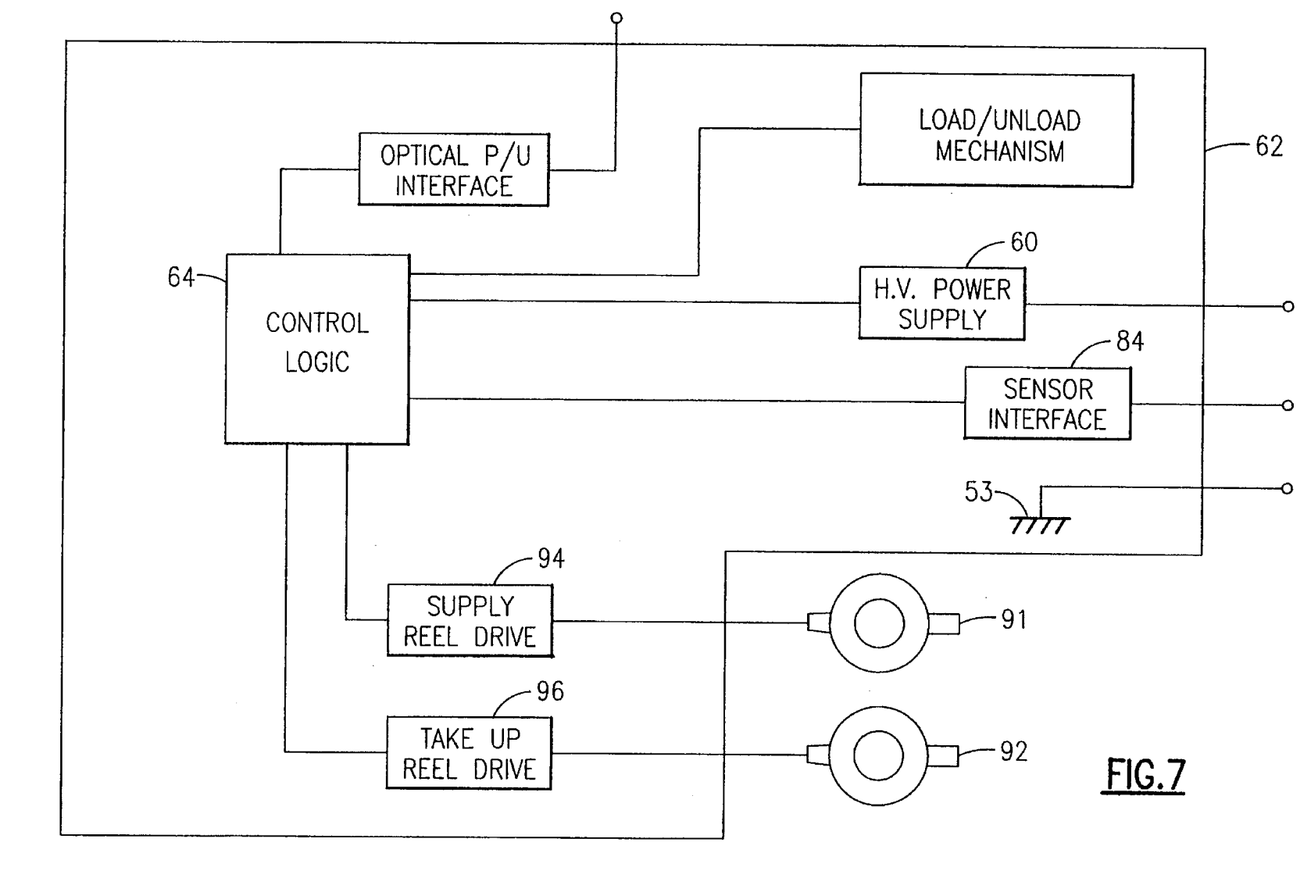
FIG. 7 is a block diagram of the player electronics of an optical ribbon paquette player suitable for playing the paquette of FIG. 1.

Referring now to FIGS. 2, 3 and 7, in FIG. 2 there is shown a cross-sectional plan view of the paquette 10. The paquette 10 contains a predetermined length of suitable optical tape 12. Preferably optical tape 12 is of length and width proportional to the recorded information. Lengths may be in the order of 10 to 100 meters, and widths in the order of 19 to 4 millimeters, respectively. Of course, other lengths and widths of tape 12 can be employed, with the dimensions of the paquette 10 scaled accordingly.

In FIG. 3 there is shown an illustrative drawing, not to scale, of a preferred construction of tape 12. Preferably tape 12 includes five layers, protective layer 20, recorded layer 22, reflective layer 24, a smoothed substrate layer 26, and sliding layer 28. The substrate layer 26 includes a first side 29 and a second side 31. The total thickness of these five layers is preferably between 10 and 75 micrometers.

Substrate layer 26 includes for example, a polyester or polyethylene terephthalate material that provides tape 12 with mechanical strength. Sliding layer 28 coats the side 29 of substrate layer 26, and consists of a silane compound or suitable low friction material. Adjacent the other side 31 of substrate layer 26 is reflective layer 24. Reflective layer 24 consists of a conductive material, such as aluminum, or an aluminum alloy. Alternatively, layer 24 consists of gold, silver, copper, or any alloys thereof. Reflective layer 24 is positioned between substrate layer 26 and recorded layer 22.

Preferably recorded layer 22 consists of an ablative material, such as a cyanine or phthalocyainine dye thermally absorptive at the wavelength of the coherent light source chosen, or photoresist. Recorded layer 22 contains indicia 30 including lands 32 and pits 34 suitable for being read optically by the helical scan head. Recorded layer 22 is covered by protective layer 20, and is transparent to a read laser beam 18. Protective layer 20 protects the underlying lands 32 and pits 34 of recorded layer 22. Preferably protective layer 20 is much less than 10 micrometers thick. Tape 12 of this general type is sold by Imperial Chemical Industry (ICI) in the United Kingdom.

Preferably indicia 30 are recorded in a helical scan pattern on the tape 12 similar to the patterns established for helical scan recording on magnetic tape. Helical scan recording, and other types of recording (e.g., quadruplex recording) are discussed in greater detail in *Magnetic Recording Handbook,* by Marvin Camras, Van Nostrand Reinhold Company Inc., 1988, incorporated herein by reference.

Tape 12 is moved through the paquette 10 by tape transport mechanism 101. Tape transport mechanism 101 includes supply reel 14 (shown empty), take up reel 16 (shown full), conductive guide 50 for controlling the path of the tape 12, guide rods 130, and mechanical compliance mechanisms (not shown). For compactness, preferably take up reel 16 is positioned between supply reel 14 and aperture 11. Alternatively, supply reel 14 could be positioned between take up reel 16 and aperture 11, or aperture 11 could be positioned between the two reels 14 and 16. Guide 50 is shaped and positioned to guide tape 12 past window portion 15 of aperture 11 so that the helical scan head (not shown) can read tape 12 through window portion 15.

Referring now to FIGS. 2, 3, 7, and 8, in accordance with the invention reflective layer 24 is conductive and grounded at either end 44 of tape 12. The segments of guide 50 are supplied with variable high voltages 68 (FIG. 8) which produce electrostatic fields between guide surfaces 52 and the surface of grounded reflective layer 24 that faces guide surface 52. The polarity of each voltage 68 is selected such that each field produces an electrostatic force 74 which acts to attract toward and hold tape 12 to guide surface 52. By this means the tape 12 is continuously spaced apart from a surface 76 of the window 15 by a gap 70.

Electrostatic forces serve a few different purposes depending on the mode of paquette player (not shown). The relevant player modes are play mode on the one hand, and rewind and fast forward modes on the other hand.

Figure 9:
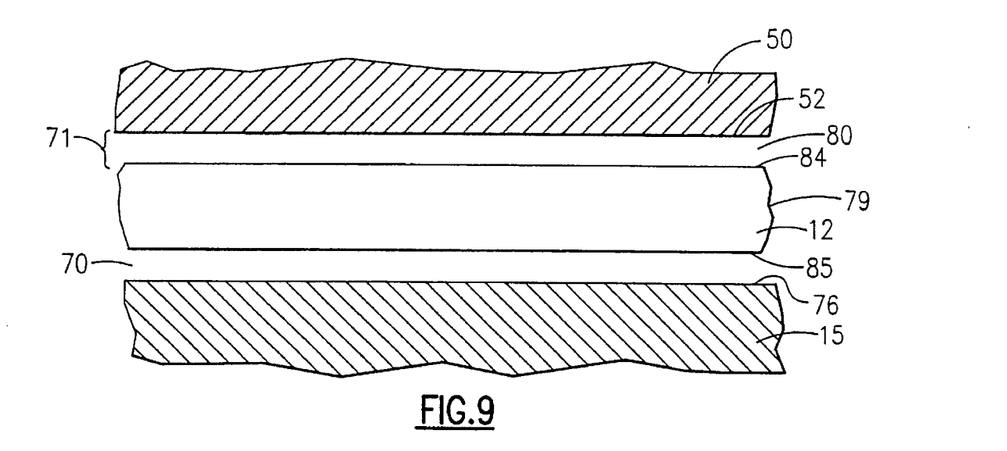
FIG. 9 is a diagram of a portion of optical ribbon in motion through the paquette of FIG. 1, the ribbon moving at a speed typical for "rewind" or "fast forward" modes.

Referring now to FIGS. 2, 7 and 9, consider first the fast forward and rewind modes of the tape player. In these modes, tape 12 needs to be quickly wound and rewound, respectively. No attempt is made by the helical scan head to actually read indicia 30 from tape 12.

In FIG. 9, tape 12 is shown moving in a direction 79 at a relatively high speed. Rapid movement of tape 12 over guide surface 52 produces a thin air, gas, or fluid bearing 80 in the generated gap 71 between guide surface 52 and an adjacent surface 84 of tape or fillet 12. Simultaneously the gap 70 between 76 and 85 is diminished slightly by the magnitude of gap 71.

Air bearing 80 allows for rapid and frictionless movement of tape 12 past window inner surface 76 and guide surface 52. As tape 12 moves rapidly, there is a danger of tape 12 fluttering, and touching guide surface 52 and window inner surface 76, or otherwise becoming unstable. To reduce the likelihood of these occurrences, the thickness of air bearing 80 is monitored by one or more sensors 82 (FIG. 13) which interface with the paquette player.

Figure 13:
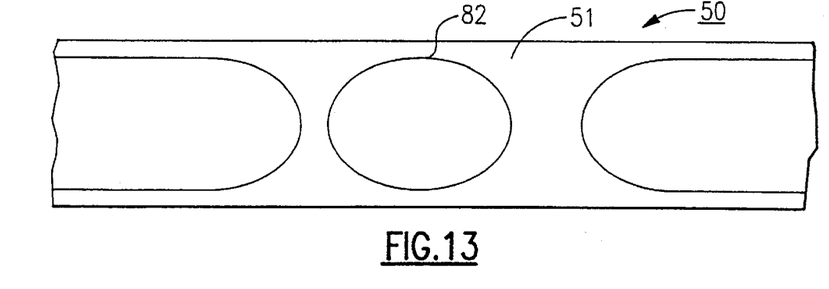
FIG. 13 is a cross sectional plan view of the conductive guide of FIG. 12, taken along section line 13—13.

Preferably sensors 82 are positioned periodically across the length of guide 50. Preferably each sensor 82 is associated with a discrete portion 51 of guide 50. In response to monitored variations in thickness of air bearing 80, the paquette player adjusts the voltages 68 applied to appropriate portions 51 of guide 50. In this manner, the attractive force 74 on tape 12 is controllably varied, thereby maintaining the requisite thickness of air bearing 80.

Figure 8:
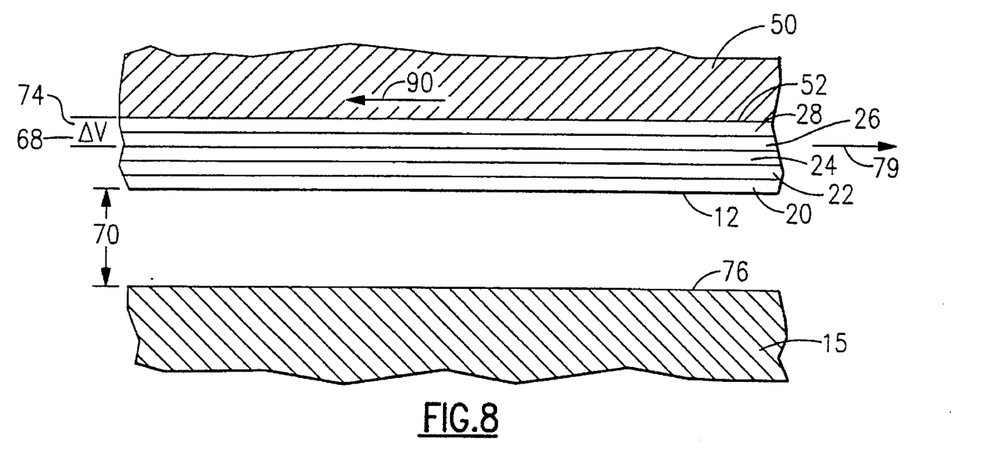
FIG. 8 is a diagram of a portion of optical tape in motion through the paquette of FIG. 1, the ribbon moving at a speed typical for "play" mode.

Referring now to FIGS. 2, 7 and 8, electrostatic force 74 serves a different purpose during play mode of tape 12 than it does during fast forward and reverse modes. During play of tape 12, a control logic 64 a causes high voltage power supply 60 to supply voltages 68 to guide 50 that cause force 74 to attract and hold tape 12 against a 180° arc guide surface segment 52-1. In this manner, indicia 30 are maintained a relatively fixed distance from the concentrically located helical scan optical head (not shown), thereby simplifying the optics of the optical head by limiting the range of focus.

Of particular importance for reading tape 12 is that tape 12 remain held continuously and uniformly against guide surface 52 along the 180° arc of guide surface segment 52-1 parallel to window portion 15. Note that when tape 12 is played, tape 12 moves in direction 79 at a relatively slow speed, generally too slow to create air bearing 80.

Another use of electrostatic force 74 in tape transport mechanism 101 is to precisely control the movement of tape 12 through paquette 10. It is well known to one skilled in the art to design a tape transport mechanism 101 to advance tape or fillet 12 at a relatively uniform speed.

Proper play of tape 12, however, requires tape 12 to move past the helical scan head (not shown) with great precision. Since tape 12 is sealed in paquette 10, the requisite tape transport mechanism 101 (FIG. 10) must also be sealed inside paquette 10. Moreover, for consumer applications, tape transport mechanism 101 must be relatively inexpensive, since commercial considerations require paquette 10 to be relatively inexpensive.

Figure 10:
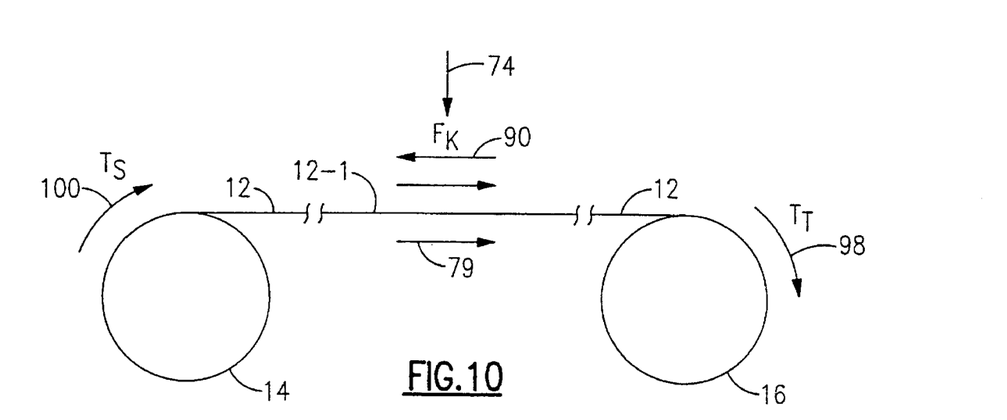
FIG. 10 is a simplified diagram of the forces acting on the ribbon, and on the supply and take up reels of the paquette of FIG. 1.
Figure 11:
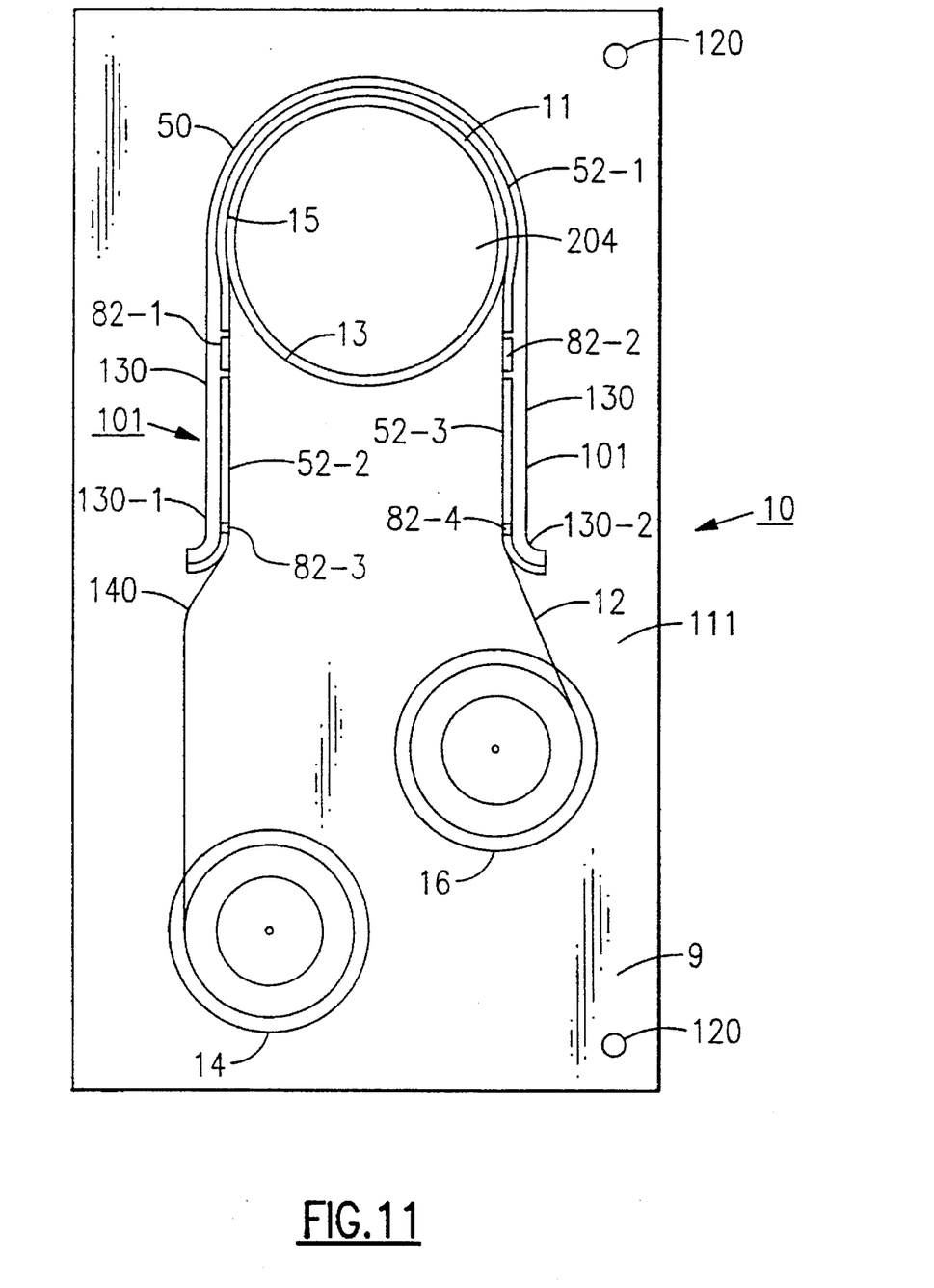
FIG. 11 is a cross sectional plan view of an alternate embodiment of a paquette of FIG. 1, in which a single high voltage is imparted to the conductive guide.
Figure 12:
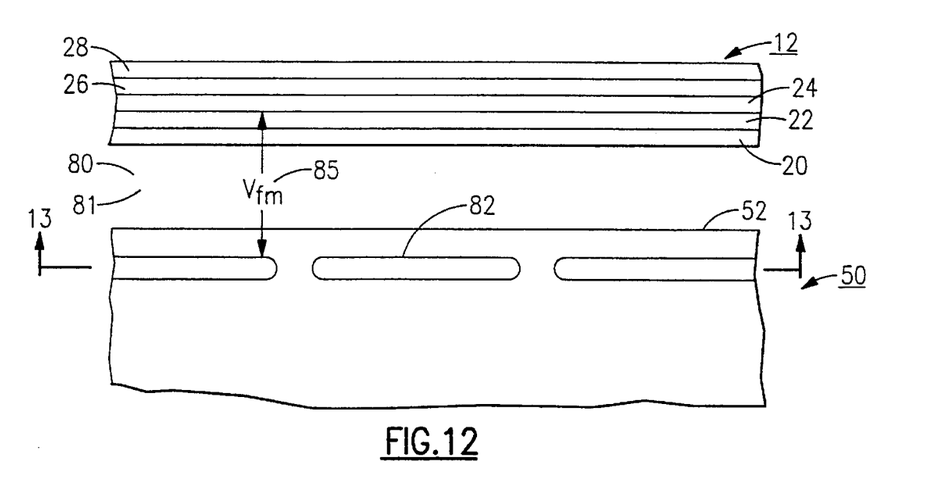
FIG. 12 is a cross sectional view of a section of the conductive guide illustrated in FIG. 11.

Referring now to FIGS. 7, 8 and 10, as tape 12 moves across guide surfaces 52 (in play mode), the movement of tape 12 is opposed by frictional forces 90. But the magnitudes of frictional forces 90 are proportional to the magnitudes of electrostatic forces 74, which can be precisely controlled by voltages 68.

The 180° arc surface segment 52-1 of the guide surface segments 52 is excited by a constant electrostatic voltage such that a contiguous segment of tape 12-1 is held, in the play mode, against 52-1, under very light longitudinal tension. Not to do so would cause peeling off of the tape segment 12-1. To minimize a differential forces which create the tension on segment 12-1, the supply reel 14 is continuously servoed forward to produce the slack 140 (FIG. 2) in the tape 12. Furthermore, the guide surface 52 between reel 14 and 180° arc guide surface segment 52-1 is excited with a low and constant voltage to the extent that the slackened tape 12 is both attracted by a curved end, 130-1, of guide segment 52 and held straight by 52 per se for tangential entry to guide 52-1. The tension on the outgoing tape segment 12-1 is the direct result of the product of the electrostatic attractive force on tape segment 12-1 and the coefficient of friction between tape segment 12-1 and the field plate guide 52-1. Hence the net coefficient of friction between the contacting surfaces of the tape 12 and the guide surface segments 52 is held to the lowest practical minimum by means of silane compounds and other materials known in the arts of tribology.

The continuously outgoing segment of tape 12-1 is drawn out tangentially across the guide surface segment 52 ultimately by means of the tension produced by the servo controlled take-up reel 16. The function of this guide surface segment 52 is manifold: (1) to provide a tangential path for the tape segment 12-1 continuously leaving the 180° arc scan surface segment 52-1, (2) to isolate the low tension in the 180° arc surface segment 52-1 of tape segment 12-1 from the higher tension produced by the acceleration of the reel motor 16, and (3) to synchronize the speed of the tape 12 with the helical scanning of the optical head (not shown).

The transport mechanism 101 is functionally symmetrical as shown in FIG. 10, permitting all forward and reverse modes.

Note that as tape 12 is pulled onto take up reel 16, it is rigid between reel 16 and guide 50, but slack between supply reel 14 and guide 50. Preferably in play mode the tape 12 is slack when coming off a reel 14 or 16. This allows a greater ability for frictional force Fk 90 to precisely control the speed of.

Referring now to FIG. 1, 2, 3, 4, 5, 6 and 7, it is shown how tape 12 is grounded. Supply and take up reels 14 and 16 include hubs 40 and 42, respectively, onto which tape 12 is wound. Each end 44 of tape or fillet 12 includes a conductive portion 45 that has reflective layer 24 exposed such that it contacts an outer surface 46 of hubs 40 or 42. Hubs 40 and 42 each include a contact 48 disposed on outer surface 46. Each contact 48 makes electrical contact with the reflective layer 24 of the associated end portion 44. In turn, contacts 48 are connected to a ground 53 external to the paquette 10.

The tape 12 has five functional segments: (1) the segment between the supply reel 14 and the guide surface 52-2; (2) the segment between the guide surface 52-2; (3) the 180° arc guide surface 52-1; (4) the surface 52-3; and (5) the segment between surface 52-3 and the take up reel 16. Between the adjacent surfaces is an insulated electrostatic charge drain 82-3, 82-1, 82-2 and 82-4, respectively. The function of drains 82-3 and 82-4 is to ensure charges do not build tip on tape 12 in the supply and take up reels, 14 and 16, respectively. Drains 82-1, 82-2, 82-3 and 82-4 isolate the charges on surfaces 52-2, 52-1 and 52-3 respectively.

Referring now to FIG. 2, 7 and 8, in FIG. 7 there is shown player electronics 62 of the paquette player (not shown). Player electronics 62 includes the high voltage power supply 60 and the control logic 64. Power supply 60 is controlled by control logic 64, and is connected to guide 50. Control logic 64 can control power supply 60 to provide a particular voltage or voltages 68 to all or select portions of guide surface 52. Voltages 68 are relative to reflective layer 24 of grounded tape 12. To ground tape 12, player electronics includes the ground 53.

Another relatively straight forward element of tape transport mechanism 101 are movable guides (not shown) for mechanical compliance. These and other common elements of tape transport mechanism 101, and alternative elements, are discussed in greater detail in Chapter 7 of *Magnetic Recording Handbook*, by Marvin Camras, Van Nostrand Reinhold Company, Inc. 1988, incorporated herein by reference.

Design of a helical scan optical head is well known to those skilled in the art. For example, U.S. Pat. No. 5,239,528, incorporated herein by reference, discloses a control circuit for controlling the focus of a two head helical scan optical head. The particular head described is designed such that optical tape is in contact the rotating optical head, rather than separated from the head by a window (such as window portion 15).

For the optical ribbon paquette 10, the design of a suitable optical head is substantially the same as for a optical head that contacts a conventional optical tape, with two differences worth noting. First, laser beam 18 must pass through an additional optical interface, window portion 15. Preferably window portion 15 includes optical coatings designed to minimize power loss and distortions due to reflections.

Second, there is a greater distance between the optical head and recorded layer 22. This greater distance is due to the presence of window portion 15, and due to mechanical clearances needed for the optical head to fit inside aperture 11, and for tape 12 to move between guide surface 52 and window inner surface 76.

Sealing the paquette 10 has benefits beyond limiting the exposure of tape 12 to contaminants. As discussed in U.S. Pat. No. 4,814,925, incorporated herein by reference, in some cases atmospheric gases may react with materials used to make the paquette 10. Sealing the paquette 10 and filling the paquette 10 with a chemically inert gas, such as argon or helium, would reduce the likelihood of such reactions.

Another benefit of sealing the paquette 10 is simplified design of sensors 82. As previously mentioned, the preferred sensor 82 is a capacitance sensor. When the air bearing 80 forms part of the dielectric of capacitance sensor 82, the composition of the gases of air gap 80 will affect the reading of sensor 82. Sealing the paquette 10 reduces the effects of changing environment on sensor 82.

Even with a sealed the paquette 10, contaminants present a problem to the proper operation of paquette 10. Unless costly and complicated manufacturing techniques are used to make paquettes 10, some level of contaminants will be present in each new the paquette 10. As the tape 12 in a respective paquette 10 is played, friction between moving parts, such as between tape 12 and guide 50, will produce some level of contaminants.

To reduce the level of these contaminants, preferably certain interior surfaces 111 of the paquette 10 include an adhesive coating 9 suitable for these contaminants to adhere to, thus removing them from possible contact with tape 12. Appropriate adhesive coatings 9 include unpolymerized gums of suitable tackiness.

As previously discussed, however, tape transport mechanism 101 relies on friction force Fk 90 to precisely regulate the speed of tape 12. Fortunately, a number of features of the construction of the paquette 10 allows a satisfactory balancing between these two conflicting considerations. First, the sealed nature of the paquette 10 allows voltages 68 to be of relatively great magnitude (e.g., on the order of several hundred volts) without risk to the user. The greater the range of possible voltages 68, the greater the range of possible forces 74.

Figure 14:
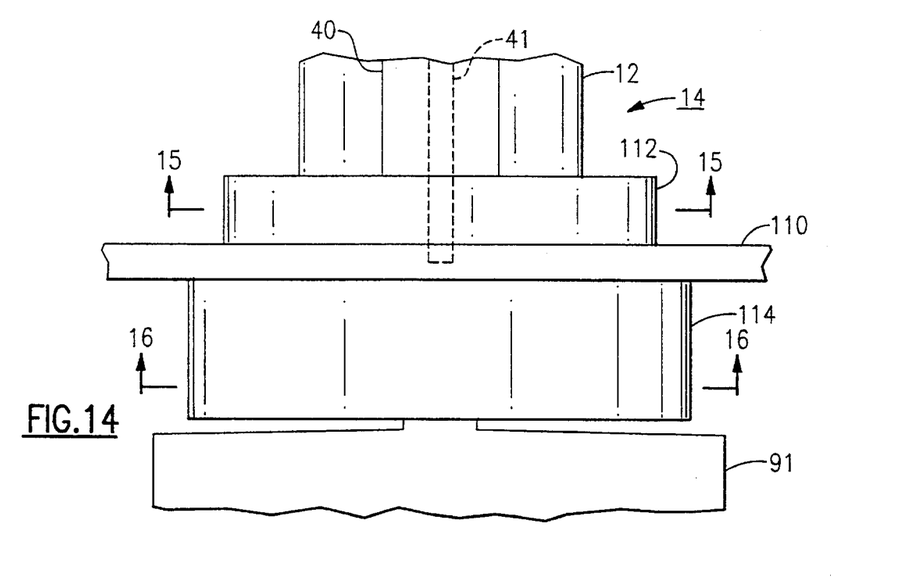
FIG. 14 is a partial side view of a supply reel and the mechanism for driving the reel in accordance with the teachings of the present invention, the driving mechanism including a magnetic base plate.
Figure 15:
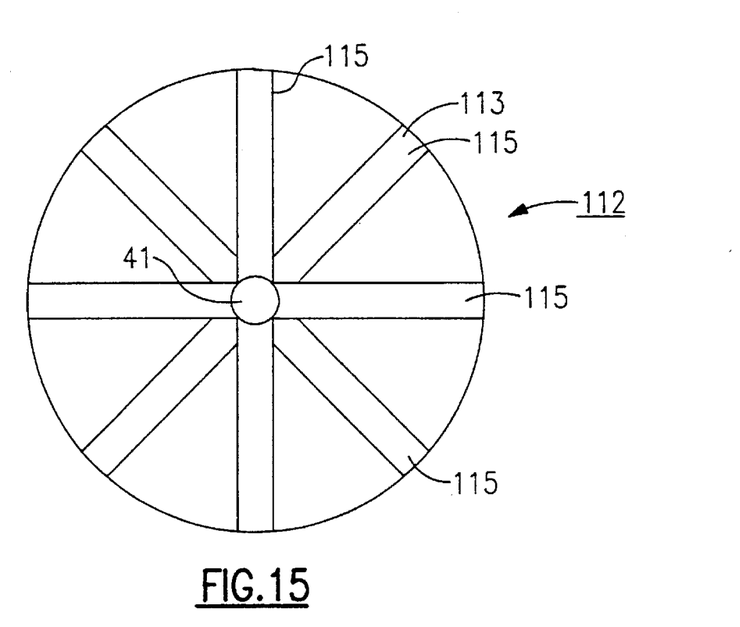
FIG. 15 is a cross sectional top view of the magnetic base plate of FIG. 14 taken along section line 15—15.

Referring now to FIGS. 2, 7, 14, 15 and 16, preferably motors 91 and 92 convey rotational motion to respective reels 14 and 16 by means of magnetic coupling. In FIG. 14, there is shown optical tape 12 wrapped around hub 40 of supply reel 14. Reel 14 includes a magnetic base plate 112 on which tape 12 rests. Base plate 112 is positioned between a housing 110 of for paquette 10 and reels 14 and 16. Hub 40 includes a shaft 41 that extends through base plate 112 into housing 110 of the paquette 10 to anchor reel 14. Like tape 12 wound on reel 14, base plate 112 is axially aligned with shaft 41, and rotates about shaft 41. Magnetic base plate 112 contains an embedded magnetic material 113. Preferably soft magnetic material 113 consists of a spider 115 that radiates from the axis of rotation defined by shaft 41.

Figure 16:
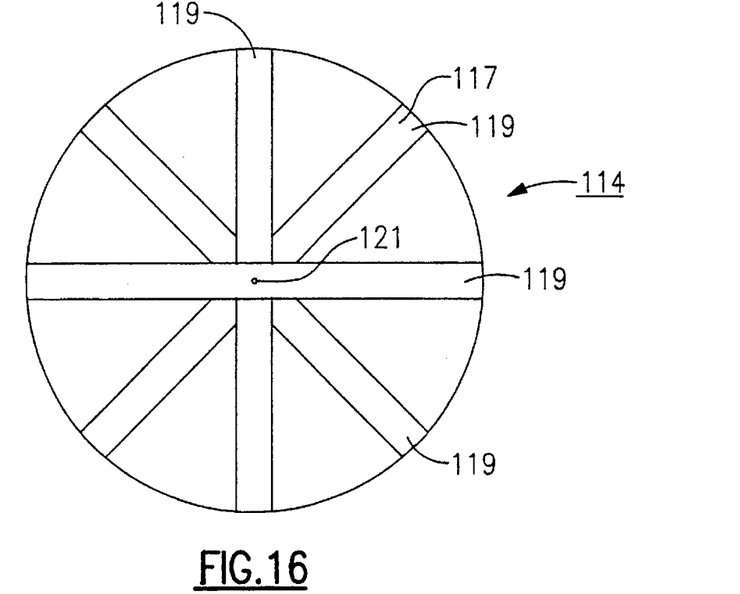
FIG. 16 is a cross sectional side view of the magnetic spindle of FIG. 14, taken along section line 16—16.

Similarly, motor 91 drives a magnetic spindle 114, which preferably consists of a permanent magnetic material 117 configured as radial fingers 119 that radiate from an axis of rotation 121. In operation, spider 119 magnetically couple with fingers 115, so that rotation of magnetic spindle 114 is matched by a similar rotation by magnetic base plate 112.

To reduce the possibility of arcing, conductive parts such as sensor 82, are designed with rounded corners (i.e., no sharp edges).

The spider 115 and fingers 119 are loosely coupled magnetically in order that there be a finite torsional compliance between the tape 12 them. The variable friction between and guides 52 may range from that required for synchronous write and read to that required for the additional modes of fast access, shuttle-repeat, fast forward and reverse, involve the extreme of virtually instantaneous braking. The low time constant of this portion of the transport cannot be matched by that of a full reel and the servoed fast response reel motor combination. The torsional compliance defined above therefore permits virtually instant tape motion without the creation of tape slack or excessive tape tension.

Figure 17:
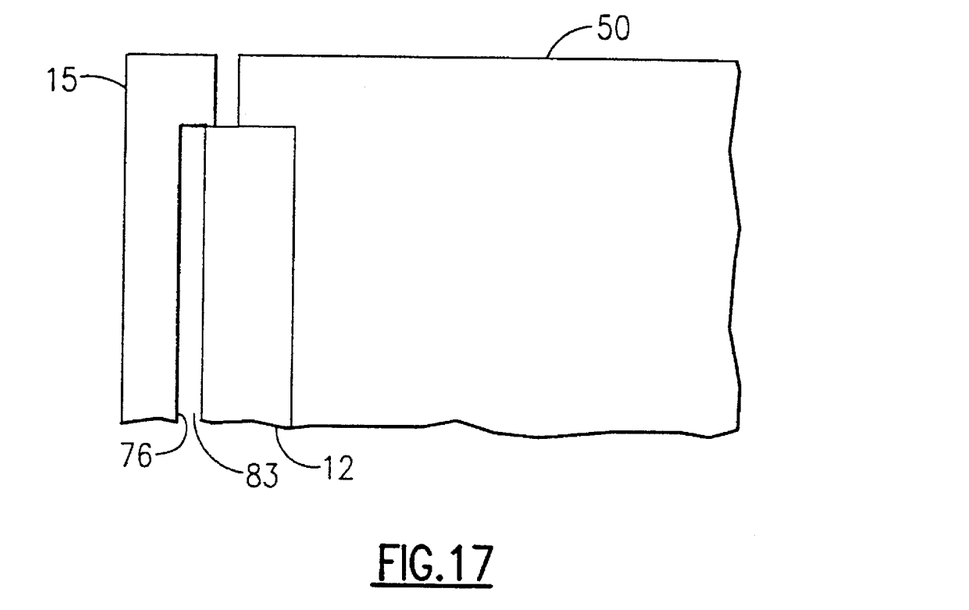
FIG. 17 is a partial cross sectional side view of the aperture window and conductive guide employed in conjunction with the paquette of the present invention.

Referring now to FIG. 17, which is not to scale, there is shown in greater detail how the construction of guide 50 provides for vertical registration of tape 12. Tight tolerances allow little room for vertical movement by tape 12. Referring now to FIG. 2, registration of the paquette 10 within the paquette player (not shown) is accomplished using two or more registration pins 120. The use of registration pins 120 for alignment is well known to those skilled in the art.

OTHER EMBODIMENTS

Figure 18:
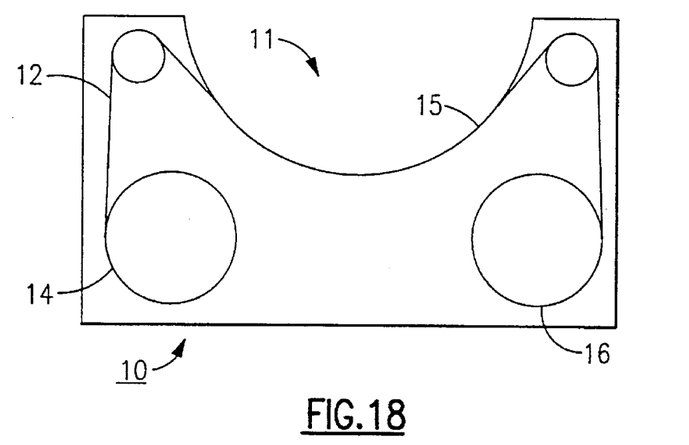
FIGS. 18 through 20 are alternative embodiments of the paquette of FIG. 1.
Figure 19:
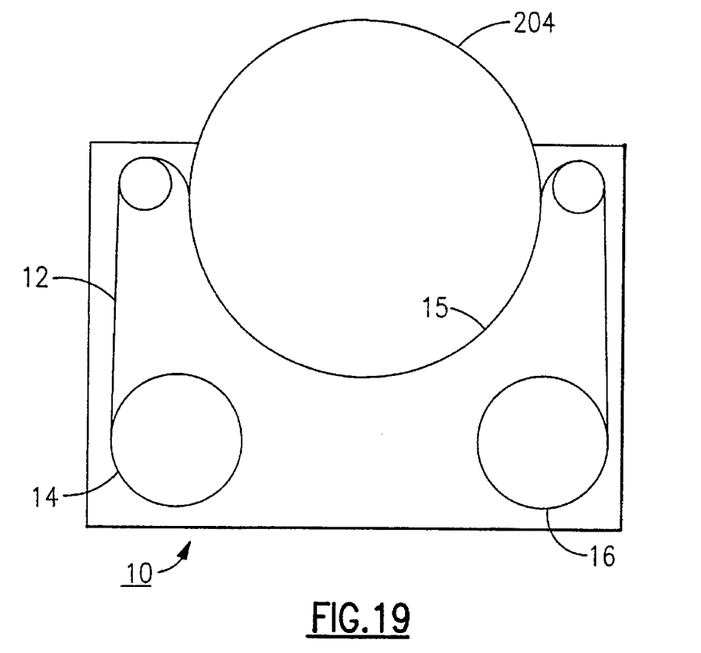
Figure 20:
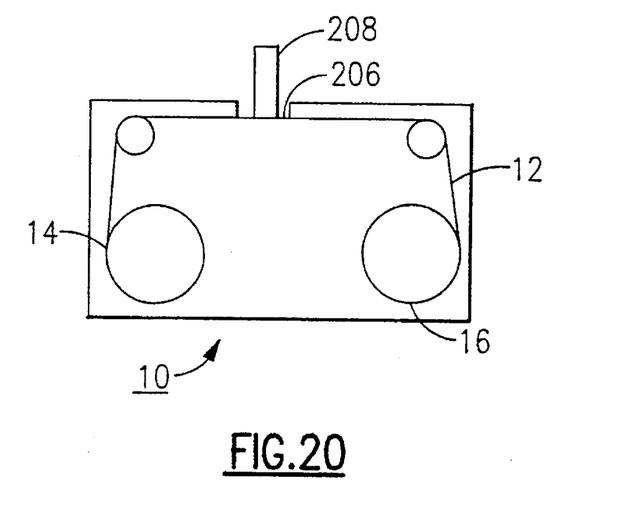

Referring now to FIGS. 18, 19 and 20, there are shown alternate embodiments for the paquette 10. In all three figures, similar elements of the figure paquette 10 are labeled with like numbers. In FIG. 18, the paquette 10 is constructed with aperture 11 being an indentation in a side 202 of the paquette 10. Window portion 15 of aperture 11 is shaped as an arc of a circle, about 90 degrees in extent, to accommodate a helical scan head (not shown) having a wrap around angle of about 90 degrees.

In FIG. 19, window portion 15 of aperture 11 is also shaped as an arc of a circle, but with an extent of about 180 degrees, to accommodate helical scan head 204 having a wrap around angle of about 180 degrees.

In FIG. 20, a transverse scan head 208 is used to read tape 12 through a window portion 206 of provided in the paquette 10, rather than a helical scan head.

Although the invention has been described with reference to particular means and embodiments, it is understood the invention is not confined to the embodiments described and illustrated herein.

I claim:

1. An optical tape cartridge suitable for playing by a player, the player associated with a voltage supply capable of supplying said optical tape cartridge with a controllably variable voltage, said optical tape cartridge comprising:

a sealed cartridge housing;

first and second tape reels disposed within said sealed cartridge housing, said first and second tape reels each being freely rotatable and acting as tape supply and tape take up reels;

an optical tape having a first surface end an optically recordable side, said optical tape being wound on and thereby coupling each of said first and second reels by a an optical tape having a first surface and an optically recordable side, said optical tape being wound on and thereby coupling each of said first and second reels by a segment of said optical tape so that said optically recordable side faces away from each of said reels, said optical tape further having a conductive layer extending substantially the length thereof, said conductive layer being grounded;

sealed window means being positioned on a surface of said sealed cartridge housing and disposed across a portion of said segment of said optical tape for enabling optical reading from said segment; and conductive guide means for guiding said segment of said optical tape past said sealed window means, said conductive guide means having a portion disposed adjacent said sealed window means and being connected to the controllably variable voltage supplied by the voltage supply, said first surface of said segment thereby being maintained a predetermined, substantially fixed distance from said sealed window means by electrostatically attracting said conductive layer of said segment toward said conductive guide means with an attractive force controlled by the supplied voltage, said attractive force being changeable by corresponding changes in applied voltage so that a preselected fixed distance is maintained between said conductive guide means and said segment of optical tape.

2. The optical tape cartridge according to claim 1 wherein said conductive guide means further includes a first guide surface adjacent said first surface of said optical tape, and said first surface includes a relatively low friction coating.

3. The optical tape cartridge according to claim 1 wherein said conductive guide means further includes at least one means for sensing distance between said conductive guide means and said optical tape.

4. The optical tape cartridge according to claim 1 wherein said sealed cartridge housing includes an inner surface and contains a dry inert gas being chemically non-reactive with said inner surface of said sealed cartridge housing, said optical tape, and said conductive guide means.

5. An optical tape cartridge suitable for playing by a player, the player associated with a voltage supply capable of supplying said optical tape cartridge with a controllably variable voltage, said tape cartridge comprising:

a sealed cartridge housing;

first and second tape reels disposed within said sealed cartridge housing, said first and second tape reels each being freely rotatable and acting as tape supply and tape take up reels;

an optical tape having a first surface and an optically recordable side, said optical tape being wound on and thereby coupling each of said first and second reels by a segment of said optical tape so that said optically recordable side faces away from each of said reels, said optical tape further having a second surface opposite said first surface and a conductive layer extending substantially the length of said optical tape, said conductive layer being grounded by at least one end thereof;

sealed window means being positioned on a surface of said housing and disposed across a portion of said segment of said optical tape for enabling optical reading from said segment; and conductive guide means for guiding said segment of said optical tape past said sealed window means, said conductive guide means being connected to the controllably variable voltage supplied by the voltage supply to thereby maintain said second surface of said segment a relatively fixed distance from said guide means by electrostatically attracting said conductive layer of said segment toward said guide means while a fluid bearing separates said guide means from said second surface of said segment, said relatively fixed distance being maintained by changes in the controllably variable voltage supplied by said voltage supply.

6. The optical tape cartridge according to claim 5 wherein said conductive guide means further includes a first guide surface adjacent said first surface of said optical tape, and said first surface includes a relatively low friction coating.

7. The optical tape cartridge according to claim 5 wherein said conductive guide means further includes at least one means for sensing distance between said conductive guide means and said optical tape.

8. The optical tape cartridge according to claim 5 wherein said sealed cartridge housing includes an inner surface and contains a dry inert gas chemically non-reactive with said inner surface of said sealed cartridge housing, said optical tape, and said conductive guide means.

9. The optical tape cartridge according to claim 8 wherein said dry inert gas is helium.

10. An optical tape cartridge suitable for playing by a player, the player associated with a voltage supply capable of supplying said optical tape cartridge with a controllably variable voltage, said optical tape cartridge comprising:

a sealed cartridge housing;

first and second tape reels disposed within said sealed cartridge housing, said first and second tape reels each being freely rotatable and acting as tape supply and tape take up reels;

an optical tape having a first surface and an optically recordable side, said optical tape being wound on and thereby coupling each of said first and second reels by a segment of said optical tape so that said optically recordable side faces away from each of said reels, said optical tape further having a second surface opposite said first surface and a conductive layer extending substantially the length of said optical tape, said conductive layer being grounded by at least one end thereof;

sealed window means being positioned on a surface of said housing and disposed across a portion of said segment of said optical tape for enabling optical reading from said segment;

a fluid bearing adjacent a portion of said second surface of said segment of said optical tape; and conductive guide means for guiding said segment past said sealed window means, said conductive guide means being connected to the controllably variable voltage supplied by the voltage supply for maintaining said second surface of said tape segment a predetermined, substantially fixed distance from said conductive guide means by electrostatically attracting said conductive layer of said segment toward said conductive guide means while said fluid bearing separates said conductive guide means from said second surface of said segment, the electrostatic retraction being adjustable by changes in the controllably variable voltage so that said substantially fixed distance remains substantially constant during operation of the optical tape cartridge.

11. The optical tape cartridge according to claim 10 wherein said conductive guide means includes a first guide surface adjacent said first surface of said optical tape, and said first surface includes a relatively low friction coating.

12. The optical tape cartridge according to claim 10 wherein said conductive guide means further includes at least one means for sensing distance between said conductive guide means and said optical tape.

13. The optical tape cartridge according to claim 10 wherein said sealed cartridge housing includes an inner surface and contains a dry inert gas being chemically non-reactive with said inner surface of said sealed cartridge housing, said optical tape, and said conductive guide means.

14. The optical tape cartridge according to claim 13 wherein said dry inert gas is helium.

15. The optical tape cartridge according to claim 13 wherein said dry inert gas is argon.

16. An optical tape cartridge for use with a player, said tape cartridge comprising:

a sealed housing capable of being loaded into and out of the player;

first and second tape reels disposed within said sealed housing, said first and second tape reels each being freely rotatable and acting as tape supply and tape take up reels;

an optical tape having a first surface and an optically recordable layer, said optical tape being wound onto each of said first and second reels thereby coupling said reels and forming a segment of said optical tape between said reels wherein said optically recordable side faces away from each of said reels, said optical tape further having a second surface opposite said first surface and a conductive layer extending substantially the length of said optical tape, said conductive layer being grounded at a point therealong;

sealed window means positioned on said sealed housing so that a portion of said segment of said optical tape is viewable through said sealed window means for enabling optical reading from said segment; and conductive path means for guiding said segment of said optical tape across said sealed window means, said conductive path means being connected to a controllably variable voltage supply so that when said optical tape is moving at a preselected speed, said second surface of said segment is maintained at a predetermined, substantially fixed distance from said path means by electrostatically attracting said conductive layer of said segment toward said path means with an attractive force while a fluid bearing separates said path means from second surface of said segment, said attractive force being changeable by corresponding changes in an applied voltage supplied by said controllably variable voltage supply.

17. The optical tape cartridge according to claim 16 wherein said conductive path means further includes a first path surface adjacent said first surface of said optical tape, and said first surface includes a relatively low friction coating.

18. The optical tape cartridge according to claim 16 wherein said conductive path means further includes at least one means for sensing distance between said conductive path means and said optical tape.

19. The optical tape cartridge according to claim 16 wherein said sealed housing includes an inner surface and contains a dry inert gas being chemically non-reactive with said inner surface of said sealed housing, said optical tape, and said conductive path means.

20. The optical tape cartridge according to claim 19 wherein said dry inert gas is helium.

21. An optical tape cartridge for use with a player associated with a voltage supply capable of supplying said optical tape cartridge with a controllably variable voltage, said optical tape cartridge comprising:

a sealed housing capable of being loaded into and out of the player;

first and second tape reels disposed within said sealed housing, said first and second tape reels each being freely rotatable and acting as tape supply and tape take up reels;

an optical tape having a first surface and an optically recordable layer, said optical tape being wound onto each of said first and second reels thereby coupling said reels and forming a segment of said optical tape between said reels so that said optically recordable side faces away from each of said reels, said optical tape further having a second surface opposite said first surface and a conductive layer extending substantially the length of said optical tape, said conductive layer being grounded by at least one point thereof;

sealed window means being positioned on a surface of said housing and disposed across a portion of said segment of said optical tape for enabling optical reading from said segment;

a fluid bearing adjacent a portion of said second surface of said segment of said optical tape; and conductive guide means for guiding said segment across said sealed window means, said conductive guide means being connected to the controllably variable voltage supplied by the voltage supply so that when said optical tape is moving at a relatively high speed, said second surface of said tape segment is maintained at a predetermined, substantially fixed distance from said conductive guide means by electrostatically attracting said conductive layer of said segment toward said conductive guide means while said fluid bearing separates said conductive guide means from said second surface of said moving segment, the electrostatic attraction being changeable by corresponding changes in the voltage applied by the voltage supply.

22. The optical tape cartridge according to claim 21 wherein said conductive guide means includes a first guide surface adjacent said first surface of said optical tape, and said first surface includes a relatively low friction coating.

23. The optical tape cartridge according to claim 21 wherein said conductive guide means further includes at least one means for sensing distance between said conductive guide means and said optical tape.

24. The optical tape cartridge according to claim 21 wherein said sealed housing includes an inner surface and contains a dry inert gas being chemically non-reactive with said inner surface of said sealed housing, said optical tape, and said conductive guide means.

25. The optical tape cartridge according to claim 24 wherein said dry inert gas is helium.

26. The optical tape cartridge according to claim 24 wherein said dry inert gas is argon.

* * * * *

UNITED STATES PATENT AND TRADEMARK OFFICE
CERTIFICATE OF CORRECTION

PATENT NO. : 5,587,993
DATED : December 24, 1996
INVENTOR(S) : David P. Gregg

It is certified that error appears in the above-identified patent and that said Letters Patent is hereby corrected as shown below:

Col. 3, line 27, delete "side" between "sectional" and "view" and insert -- top -- in place thereof.

Col. 4, line 7, delete "other" between "the" and "side".

Col. 4, line 23, delete "12" between "Tape" and "of".

Col. 5, line 25, delete "a" between "64" and "causes" and insert --a-- between "causes" and "high".

Col. 7, line 41, delete "the" between "sealed" and "paquette".

Col. 7, line 42, insert -- the -- after "of" and before "paquette".

Col. 7, line 45, delete "the" (first occurrence)

UNITED STATES PATENT AND TRADEMARK OFFICE
CERTIFICATE OF CORRECTION

PATENT NO. : 5,587,993
DATED : December 24, 1996
INVENTOR(S) : David P. Gregg

It is certified that error appears in the above-identified patent and that said Letters Patent is hereby corrected as shown below:

Col. 8, line 5, delete "of" between "110" and "for".

Col. 8, line 49, delete "figure" between "the" and "paquette".

Col. 8, line 62, delete "of" between "206" and "provided".

Signed and Sealed this

Twenty-ninth Day of February, 2000

Attest:

Q. TODD DICKINSON

*Attesting Officer*          *Commissioner of Patents and Trademarks*